United States Patent
Meder et al.

[11] 3,797,569
[45] Mar. 19, 1974

[54] CAGE TYPE RADIATION RECUPERATOR

[75] Inventors: Siegfried R. Meder, Pittsburgh; Thomas E. Dixon, Allison Park, both of Pa.

[73] Assignee: The American Schack Company, Inc., Pittsburgh, Pa.

[22] Filed: Mar. 29, 1973

[21] Appl. No.: 345,872

[52] U.S. Cl.................. 165/169, 165/76, 432/76
[51] Int. Cl............................................ F28f 3/12
[58] Field of Search....... 165/76, 77, 252, 141, 168, 165/169; 432/48, 76, 178, 179

[56] References Cited
UNITED STATES PATENTS

| | | | |
|---|---|---|---|
| 2,717,766 | 9/1955 | Becker | 165/77 X |
| 2,849,218 | 8/1958 | Cone et al. | 432/48 |
| 3,301,319 | 1/1967 | Merrill | 165/77 X |
| 3,301,320 | 1/1967 | Huntington | 165/141 X |
| 3,333,123 | 7/1967 | Baumann | 165/169 |

*Primary Examiner*—Charles J. Myhre
*Assistant Examiner*—Theophil W. Streule, Jr.
*Attorney, Agent, or Firm*—Stanley J. Price, Jr.

[57] ABSTRACT

A cage type radiation recuperator has a plurality of preconstructed, interengageable, congruent panel sections that form a closed flue chamber for the passage of flue gas therethrough. Each of the panel sections includes a plurality of conduits supported in spaced parallel relation adjacent the panel sections by brackets mounted transversely on the panels. Hot flue gas from a combustion furnace enters the flue chamber and radiantly transfers energy to the cold air circulating through the conduits. The cold air supplied by an air inlet duct and heated by the flue gas passes the length of the flue chamber through the conduits into an air outlet duct where the air is delivered for subsequent use at an elevated temperature. The waste flue gas is then discharged from the flue chamber through an outlet duct connected thereto.

6 Claims, 3 Drawing Figures

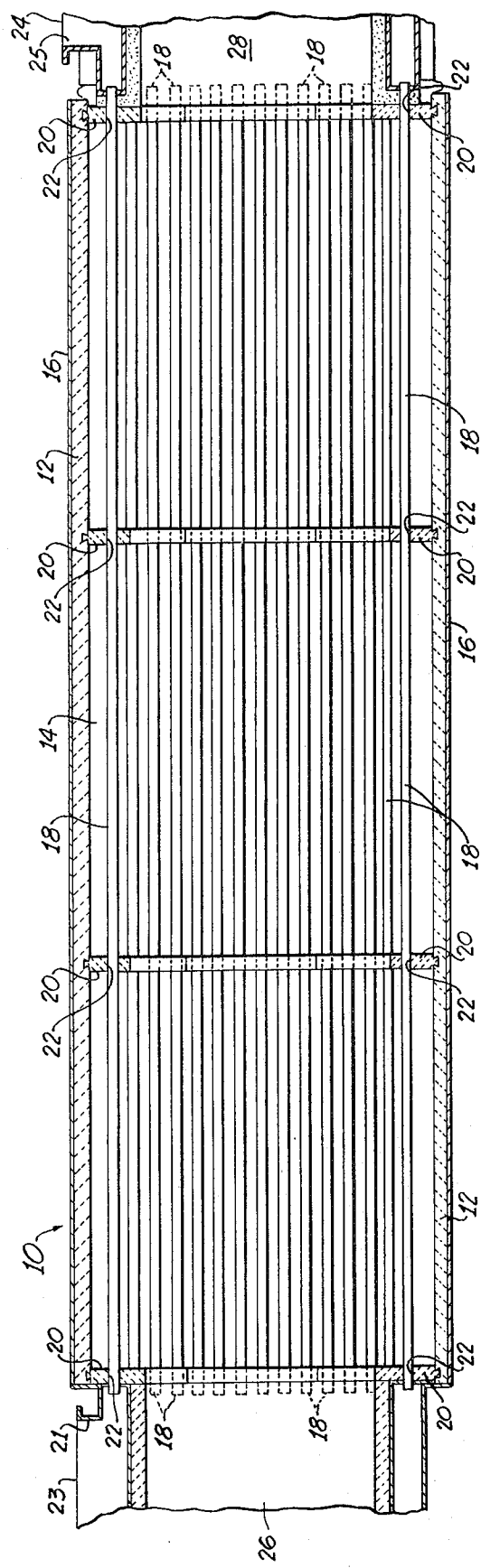
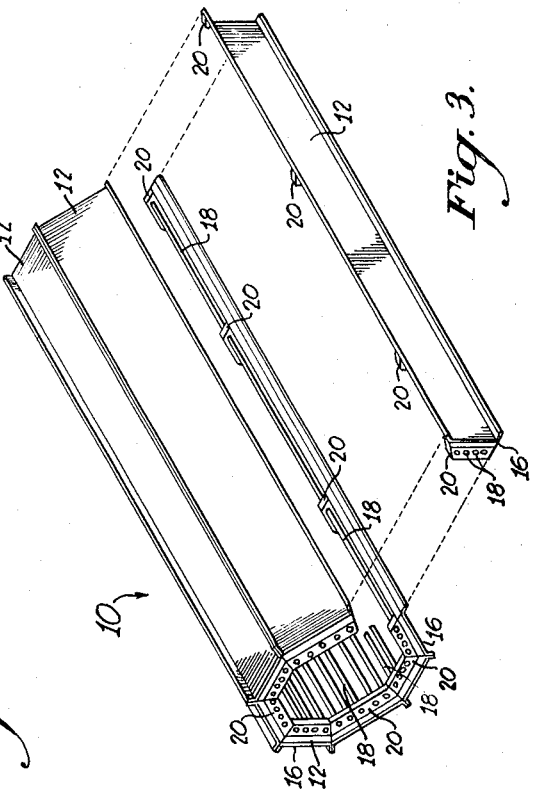
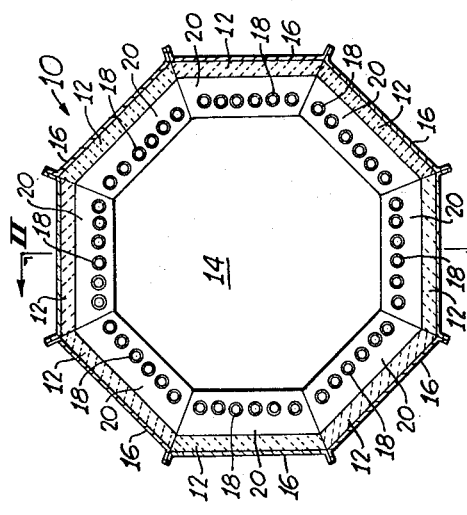

CAGE TYPE RADIATION RECUPERATOR

BACKGROUND OF THE INVENTION

1. Field of the Invention

This invention relates to a radiation recuperator and more particularly to a cage type radiation recuperator having a plurality of preconstructed, interengageable, congruent panel sections that include air tubes mounted thereto for the passage of air to be heated by the radiant energy of hot flue gas.

2. Description of the Prior Art

The typical radiation recuperator has a flue chamber for the passage of hot flue gas arranged in heat transfer relation to cold air to be heated. A typical recuperator is described in U.S. Pat. No. 1,770,936 and includes a recuperator having heating passages for subjecting separate streams of air to the heating effect of hot gas passing through a flue chamber with means for varying the portions of air in the streams. Generally, cold air enters two passageways with one stream heated by the radiant heat of the flue gas passing through the flue chamber and the other stream of air directed through the second passageway to be heated by the flue gas at a point distant from the flue chamber. To increase the capacity of this recuperator, additional sections are required to be added. The installation of additional sections necessitates the complete dismantling of the air passageway sections, together with the inlet and outlet ducts associated therewith.

U.S. Pat. No. 2,849,218 illustrates and describes a shell type combustion furnace recuperator having a vertical inner liner for receiving flue gas exhausted from a furnace. An intermediate liner surrounds the inner liner to form an air heating passageway therethrough. An inlet box supplies hot flue gas to one end of the passage a discharge means receives the waste flue gas from the other end of the passage. An outer metal support shell having a refractory lining surrounds both the inner and intermediate liners. The recuperator can be disassembled into its component parts, the inner liner, the intermediate liner and the outer shell. However, the components cannot be further broken down into sections for the purpose of transporting them from the location of fabrication to the location of operation.

There is need to provide a large radiation recuperator that is constructed from a number of smaller congruent units that are preconstructed in such a manner to permit efficient assembly at a reasonable cost at the location of operation. Construction of the recuperator at the site of operation would alleviate the substantial effort required to fabricate the units at the site. Furthermore, the recuperator must be adaptable to meet the requirements of varied space limitations in the duct system without necessitating considerable time and effort in modifying the basic recuperator design.

SUMMARY OF THE INVENTION

In this invention, there is described and illustrated a cage type radiation recuperator having a plurality of longitudinal congruent panel sections that are interengageable to form a closed flue chamber through which air to be heated is passed. A plurality of conduits are mounted in spaced parallel relation to each of the panel sections. Hot flue gas from a combustion furnace enters the flue chamber through a flue gas inlet and radiantly heats the air flowing through the conduits. The air heated in the conduits then passes from a flue gas exhaust outlet for desired use separate from the waste flue gas emitted from the flue gas exhaust outlet.

The plurality of conduits associated with each of the congruent panel sections are supported at their intermediate and end portions by brackets which are secured transversely to the panel sections. The conduits are retained in spaced parallel relation from the panel section in the brackets and are aligned with the conduits of adjacent panel sections to form a plurality of conduits extending the full length of the flue chamber. Each of the panel sections are individually preconstructed with the conduits and brackets mounted on the panel sections so that the panel sections, being of congruent design, can be interengaged with one another in assembling the flue chamber. The congruent panel sections are assembled at the operation site to meet any desired heat capacity requirement, geometric configuration or dimensional limitation.

Inlet and outlet air ducts are sealingly engaged to each end of the flue chamber and axially aligned therewith. The conduits terminate within the air inlet and outlet ducts, thereby providing for the passage of cold air from the atmosphere into the air inlet duct through the conduits within the flue chamber. Hot flue gas transported from the combustion chamber heats the cold air circulating through the conduits transferring radiant energy from the hot flue gas to the air in the conduits. The heated air passing through the conduits is directed into the air outlet duct and discharged therefrom for further use at an elevated temperature.

Accordingly, the principal object of this invention is to provide a cage type radiation recuperator that is assembled from a plurality of interengageable, congruent panel sections which are preconstructed to provide efficient erection at a reasonable cost at the location of operation.

Another object of this invention is to provide a cage type radiation recuperator erected from preconstructed congruent sections adapted to meet varied dimensional and heat capacity requirements.

A further object of this invention is to provide a radiation recuperator having a plurality of interengageable, congruent sections which can be easily shipped from the place of fabrication to the place of operation of the assembled recuperator.

These and other objects of this invention will be more completely disclosed and described in the following specification, accompanying drawings and appended claims.

BRIEF DESCRIPTION OF THE DRAWINGS

FIG. 1 is an end elevation of the recuperator flue chamber formed by the plurality of interengageable, congruent panel sections according to the invention.

FIG. 2 is a cross sectional view in side elevation taken along the line II—II of FIG. 1, illustrating the conduits arranged in the flue chamber, including the inlet and outlet ducts according to the invention.

FIG. 3 is a perspective view of the flue chamber illustrating the placement of one of the plurality of panel sections into position for assembly of the cage type recuperator according to the invention.

DESCRIPTION OF THE PREFERRED EMBODIMENTS

Referring to the drawings, and particularly FIGS. 1 and 2, there is illustrated a cage type radiation recuperator, generally designated by the numeral 10, which includes a plurality of interengageable, congruent panel sections 12 having a length greater than the width and arranged in a cage type configuration to form a flue chamber 14 therein. Each of the panel sections 12 has a planar flanged outer shell 16 integral therewith. The plurality of panel sections 12, with outer shells 16, are suitably engaged to provide a fluid and thermal tight seal between adjacent panel sections 12. The panel sections 12 are adapted for arrangement in any suitable configuration to form the flue chamber 14 which is illustrated in FIG. 1 as having an octagonal cross section; however, any other polygonal geometric shape may be utilized. The panel sections 12 may be curved rather than straightedged, as illustrated in the preferred embodiment, to form a circular or eliptical flue chamber 14.

Each of the panel sections 12 includes a plurality of air tubes or conduits 18 extending the length of the flue chamber 14. The conduits 18 are secured in parallel spaced relation to the panel sections 12 by brackets 20. The brackets 20 are mounted transversely to each of the plurality of panel sections 12 in spaced regular intervals along the length thereof. Each of the brackets 20 is suitably engaged to the panel sections 12 and has bores 22 extending therethrough in which the conduits 18 pass.

Before the plurality of panel sections 12 are engaged to one another to form the flue chamber 14, the brackets 20 are attached along the length of each panel section 12 at the end and intermediate portions thereof with the bores 22 axially aligned for the placement of the conduits 18 therethrough. With this arrangement, the panel sections 12 are preconstructed in a fabrication shop to include the brackets 20 and the conduits 18, all of which are transported as prefabricated, congruent sections to a construction location for erection. The congruent panel sections 12 are assembled to conform to any dimensional specification by engaging the necessary number of panel sections in the desired configuration whereby the flue chamber 14 constitutes the composite structure. As is illustrated in FIG. 3, any number of panel sections 12 may be interengaged to meet the required specifications of the radiation recuperator 10.

After the panel sections 12, complete with the conduits 18 and brackets 20 are assembled in the desired configuration to form the central flue chamber 14, a cold air inlet duct 23 and a hot air outlet duct are axially positioned to each end of the flue chamber 14 in fluid communication with the conduits 18. The air inlet duct 23 has a circular opening 21 therethrough transverse to the longitudinal axis of the flue chamber 14 for the passage of cold air from the atmosphere. The cold air is directed from the air inlet duct 23 into the conduits 18 which communicate with the air inlet duct 23. The air inlet duct 23 is sealingly engaged to the end of flue chamber 14 to prevent the escape of air therefrom. The plurality of conduits 18 collectively communicate with the air inlet duct 23 so that cold air is directed from the inlet duct 23 into the conduits 18.

The air outlet duct 24 is sealingly engaged to the opposite end of the flue chamber 14 to prevent the escape of hot air from between the connection of the outlet duct 24 and the flue chamber 14. The outlet duct 24 includes a circular opening 25 transverse to the longitudinal axis of the flue chamber 14. Once the air passing through the conduits 18 is radiantly heated by the flue gas in the chamber 14, it enters the air outlet 24 and exits the recuperator 10 through the opening 25.

A flue gas inlet duct 26, having an outer diameter less than the inner diameter of the cold air inlet duct 23, is coaxially aligned with the flue chamber 14 and sealed in a fluid tight engagement thereto. The flue gas inlet duct 26 lies in fluid communication with a combustion furnace (not shown) for the transportation of hot flue gas therefrom. At the other end of the flue chamber 14 is positioned the waste gas outlet 28. The waste gas outlet 28 is also axially aligned in a fluid tight engagement with the flue chamber 14. The outer diameter of the waste gas outlet duct 28 is less than the inner diameter of the air outlet duct 24 thus providing for flow of the heated air from the recuperator 10 separate from the flow of waste gas from the flue chamber 14. Aligned with waste gas outlet 28 is an exhaust cap (not shown) to permit the flow of waste gas from the flue chamber 14.

Also in accordance with the invention each panel section 12 of the composite recuperator 10 may be provided with individual air inlet and air outlet ducts similar to the air inlet and outlet ducts 23 and 24 illustrated in FIG. 2. With this arrangement, air to be heated is individually fed to each panel section 12 of the composite recuperator 10 where it enters the conduits 18 of the respective panel section 12. The air circulating through the conduits 18 is radiantly heated, as described hereinabove, by the transfer of heat from the flue gas in the chamber 14. However, rather than pass the entire length of the chamber 14, the heated air exits the conduits 18 through an air outlet duct at the opposite end of the respective panel section 12. The outlet duct, in turn communicates with only the conduits 18 of the respective panel section 12. Accordingly, an inlet and outlet air duct would be provided for the conduits 18 of each panel sections 12 forming the composite recuperator 10.

In operation, cold air to be heated is introduced into the cage type radiation recuperator 10 through the opening 21 in the air inlet duct 23 and enters the plurality of conduits 18 that are supported by the panel sections 12. The flue gas emitted from the combustion furnace passes through the flue gas inlet duct 26 into the flue chamber 14. The radiant energy emitted by the hot flue gas passing through the flue chamber 14 transfers heat to the conduits 18. Accordingly, the cold air circulating through the conduits 18 is heated by the transfer of energy from conduits 18 to the air. The illustrated embodiment shows an air-gas parallel flow arrangement; however, it is to be understood that other air-gas flow arrangements may be utilized, such as counterflow and upward and downward flow arrangements. The hot flue gas continues to radiantly transfer heat to the air within the conduits 18 as it circulates along the length of the flue chamber 14.

The waste flue gas exits the flue chamber 14, entering the outlet duct 28 and is emitted therefrom to the exhaust cap. The hot air radiantly heated in the recuperator 10 by the flue gas passes from the conduits 18, into the air outlet duct 24, therefrom and through the opening 25 for utilization at an elevated temperature. With this arrangement, large radiation recuperators may be conveniently assembled in any desired configuration at a reasonable cost for heating substantial quantities of air.

According to the provisions of the patent statutes, we have explained the principle, preferred construction and mode of operation of our invention and have illustrated and described what we now consider to represent its best embodiments. However, we desire to have it understood that, within the scope of the appended claims, the invention may be practiced otherwise than as specifically illustrated and described.

We claim:

1. A cage type radiation recuperator comprising,
    a plurality of longitudinal, congruent panel sections interengageable to form a closed flue chamber therein,
    flue gas inlet means for introducing hot flue gas from a combustion furnace into said flue chamber,
    conduit means for directing air therethrough to be radiantly heated by the passage of hot flue gas through said flue gas chamber,
    said conduit means mounted in spaced parallel relation to the plurality of longitudinal, congruent panel sections, and
    flue gas exhaust means for removing the waste flue gas emitted from the flue chamber.

2. A cage type radiation recuperator as set forth in claim 1 in which each of said panel sections includes, a flanged planar shell mounted on the outer surface of said panel section,
    a plurality of conduits for the passage of air therethrough to be radiantly heated by the flow of hot flue gas,
    said plurality of conduits arranged in spaced parallel relation relative to the longitudinal axis of said panel section, and
    a plurality of brackets mounted transversely across the width of said panel section and spaced at suitable intervals along the length thereof,
    each of said brackets having bores extending therethrough which are spaced across the width of said bracket,
    each of said brackets are positioned on said panel section so that the bores of adjacent brackets are coaxially aligned to provide retention of said conduits in spaced parallel relation in said bores.

3. A cage type radiation recuperator as set forth in claim 1 in which said conduit means includes,
    a cold air inlet duct arranged in fluid communication with said plurality of conduits so that cold air is supplied to said plurality of conduits for heating, and
    a hot air outlet duct arranged in fluid communication with said plurality of conduits so that air heated therein by said flue gas is delivered from said plurality of conduits to said outlet duct.

4. A cage type radiation recuperator as set forth in claim 1 in which said flue gas exhaust means includes, a waste gas outlet duct coaxially aligned with said flue chamber provided to emit the waste flue gas from said flue chamber,
    said waste gas outlet duct maintained in fluid separation with said conduit means.

5. A cage type radiation recuperator as set forth in claim 1 in which,
    each of said plurality of panel sections are prefabricated in accordance with a common design so that each of said panel sections is interengageable with one another to thereby provide for efficient assembly of said flue chamber.

6. A cage type radiation recuperator as set forth in claim 2 in which each of said panel sections includes, an air inlet duct secured at one end of said panel section and arranged in fluid communication with said plurality of conduits mounted to said panel section, an air outlet duct secured at the other end of said panel section and arranged in fluid communication with said plurality of conduits mounted to said panel section,
    said air inlet and outlet ducts provide for the flow of air through said plurality of conduits to be radiantly heated by the flow of hot flue gas through said flue chamber.

* * * * *